United States Patent [19]

Morimoto

[11] Patent Number: 5,751,441
[45] Date of Patent: May 12, 1998

[54] COMMUNICATION METHOD AND COMMUNICATION TERMINAL APPARATUS CAPABLE OF FULL-DUPLEX OR HALF-DUPLEX COMMUNICATION

[75] Inventor: Eiichi Morimoto, Moriyama, Japan

[73] Assignee: Murata Kikai Kabushiki Kaisha, Kyoto, Japan

[21] Appl. No.: 600,631

[22] Filed: Feb. 13, 1996

[30] Foreign Application Priority Data

Feb. 27, 1995 [JP] Japan .................. 7-038726
May 18, 1995 [JP] Japan .................. 7-120137

[51] Int. Cl.$^6$ .................................................. H04N 1/00
[52] U.S. Cl. .................. 358/435; 358/434; 358/438; 358/439; 358/401
[58] Field of Search .................. 358/401, 468, 358/434, 435, 436, 438, 439

[56] References Cited

U.S. PATENT DOCUMENTS

| | | | |
|---|---|---|---|
| 5,172,246 | 12/1992 | Yoshida | 358/434 |
| 5,237,429 | 8/1993 | Zuiss et al. | 358/435 |
| 5,351,134 | 9/1994 | Yaguchi et al. | 358/435 |
| 5,359,644 | 10/1994 | Tanaka et al. | 358/435 |
| 5,636,037 | 6/1997 | Saitoh | 358/468 |

*Primary Examiner*—Peter S. Wong
*Assistant Examiner*—Derek J. Jardieu
*Attorney, Agent, or Firm*—Loeb & Loeb LLP

[57] ABSTRACT

This invention is related to a communication terminal device and communication method for communicating with another terminal device in a full duplex manner or a half duplex manner depending upon a function of the another terminal device. A new recommendation V.8 of the International Telecommunication Union was established as a data transmission method for use in telephone exchange networks. This V.8 is suitable for use with telephone sets and data modems and not only facsimile devices. Devices which are in accordance with this new recommendation V.8 will be put on the market in the near future. Presently, half-duplex facsimile devices also exist thus functions which cope with half-duplex communication are also necessary. This invention, while being a terminal device basically adapted for the recommendation V.8, proposes a terminal device that can communicate with previously used half-duplex terminal devices, and a terminal device using that communication method.

7 Claims, 3 Drawing Sheets

COMMUNICATION METHOD AND COMMUNICATION TERMINAL APPARATUS CAPABLE OF FULL-DUPLEX OR HALF-DUPLEX COMMUNICATION

BACKGROUND OF THE INVENTION

1. Technical Field

This invention is related to a communication method of and communication terminal apparatus for communicating with a caller in a full duplex manner (e.g., that under recommendation V.8 of the ITU-T (International Telecommunication Union)) or in a half duplex manner depending upon a function of the caller.

2. Background Art

Recently, a communication terminal apparatus which can communicate in accordance with recommendation V.8 of ITU-T has been proposed. As shown in FIG. 3(A) of the accompanying drawings, for communication by recommendation V.8, a receiver of a call sends an ANSam signal (Modified Answer Tone) to a caller after a line has been established between the caller and the receiver. Then, when the caller detects the ANSam signal from the receiver, it sends to the receiver a CM signal (Call Menu Signal) after a no signal period Te thereby delivering information concerning a function of the caller, for example whether it is a facsimile apparatus or telephone or data modem etc. If the recipient detects the CM signal during transmission of the ANSam signal, it transmits to the caller a JM signal (Joint Menu Signal) showing it's own function in response to the CM signal. Through the exchange of the CM and JM signals, a modulation mode between the caller and the receiver is decided.

Furthermore, when the caller detects the JM signal, it transmits a CJ signal (CM terminator signal) to confirm receipt of the JM signal and completion of the CM signal. Following the transmission of the CJ signal, the caller further transmits 75±5ms of no signal and then executes the V.8 communication procedure. In the meantime, if the receiver detects the CJ signal, it finishes transmission of the JM signal and sends 75±5ms of no signal prior to execution of the V.8 communication procedure.

For V.8, in this way, even if the caller and receiver are connected on one line by devices having differing communication operation modes such as a facsimile apparatus, telephone or data modem and the like, an appropriate communication operation mode for both parties is automatically set by the exchange of CM signals and Jm signals etc. Due to this, today, V.8 communication is an extremely effective communication procedure in determining a proper communication mode between the caller and the receiver since different kinds of communication terminal devices are used in recent communication. It should be noted that this V.8 communication is full-duplex communication which can convey signals in both directions at the same time so that it can detect signals from the caller while transmitting signals to the caller.

However, communication by normal G3 facsimile devices is different from the aforementioned V.8 communication: (see FIG. 3(B)) after establishing a line to the receiver, the caller transmits a CNG signal (a calling tone of 1100 Hz) to the receiver. Upon detecting the CNG signal, the receiver transmits a CED signal (Called Station Identification) and a DIS signal (Digital Identification Signal) to the caller. When the caller detects the DIS signal, it transmits a DCS signal (Digital Command Signal) in response to the DIS signal to the receiver and after that, G3 communication procedures are executed between the caller and the receiver. It should be noted that this G3 facsimile communication is half-duplex communication which conveys signals one way at a time between the two parties.

Due to this, if a facsimile device of the caller is not equipped with V.8 communication functions and an ANSam signal is transmitted to the caller from the receiver equipped with V.8 communications functions, the ANSam signal cannot be detected by the caller and thus communication between the two parties is impossible. Rephrased, when the caller is a communication terminal apparatus which is not equipped with full-duplex communication functions (e.g., G3 facsimile machine), even if a predetermined full-duplex response signal is transmitted to the caller from the receiver equipped with full-duplex communication functions, the response signal cannot be detected by the caller and the two parties cannot communicate with each other.

SUMMARY OF THE INVENTION

It is an object of the present invention to propose a communication method and a communication terminal device that execute without hindrance communication operations between a caller and the receiver (i.e., communication terminal device of the invention) when the full-duplex communication starts, even in the case where the caller's communication terminal device is not equipped with a full-duplex communication functions.

In order to achieve the above object, the present invention provides a communication method for a receiver to communicate with a caller in a full-duplex communication mode or a half-duplex communication mode depending upon a function of the caller, comprising the steps of: detecting establishment of line connection between the receiver and the caller; transmitting to the caller a predetermined response signal in accordance with the full-duplex communication mode, detecting a predetermined control signal in accordance with the full-duplex communication mode from the caller and transmitting a predetermined response signal in accordance with the half-duplex communication mode to the caller if the predetermined control signal is not detected from the caller within a predetermined time after transmission of the predetermined response signal has started.

According to another aspect of the present invention, provided is a communication terminal apparatus for communicating with a caller in a full-duplex manner or a half-duplex manner depending upon a function of the caller, comprising: a signal transmission means that transmits a predetermined full-duplex response signal to the caller after establishment of line connection between the caller and itself; and a control means that causes the signal transmission means to transmit a predetermined half-duplex response signal to the caller when a predetermined full-duplex control signal is not detected from the caller within a predetermined time after transmission of the response signal has started.

If the caller is equipped with full-duplex communication functions and receives the predetermined full-duplex response signal from the receiver after the line establishment, the predetermined full-duplex control signal is transmitted to the receiver. Upon detection of the control signal by the receiver, a full-duplex communication procedure can be executed between the two parties without hindrance. Conversely, with the caller being not equipped with full-duplex communication functions, even if the predetermined full-duplex response signal is transmitted to the caller after the line connection has been established, the signal cannot be responded to by the caller and the predetermined full-duplex control signal is not transmitted to the receiver from the caller. When the full-duplex control signal from the caller is not detected within a predetermined time from the transmission start of the full-duplex response signal, the caller is judged to be a communication terminal apparatus which is not equipped with full-duplex communication functions and then the receiver transmits another response signal which is in accordance with a half-duplex communication mode. The caller can detect such a response signal so that it transmits to the receiver a predetermined half-duplex control signal. Upon receiving of the control signal by the receiver, both parties can execute half-duplex communication procedures appropriately.

The signal transmission means may be a modem. After establishment of line connection between the caller and the receiver, the control means sets the modem in a dual direction mode so that the receiver (i.e., terminal apparatus of the invention) is enabled to detect signals from the caller while the modem is transmitting a full-duplex response signal. On the other hand, the control means sets the modem in a single direction mode so that the receiver can cope with a half-duplex communication operation when a full-duplex control signal is not detected from the caller. If the modem is set to the dual direction mode, the control signal from the caller can be reliably detected even in a state where the receiver is transmitting a response signal to the caller. Also, when a control signal is not detected, appropriate half-duplex communication procedures can be executed since the modem is set to the single direction mode.

In summary, when communication is started in accordance with full-duplex communication procedures such as ITU-T recommendation V.8 and the like, there is no hindrance to communication between the caller and receiver even when the caller is a communication terminal apparatus equipped without full-duplex communication functions such as, for example, a G3 facsimile apparatus.

According to still another aspect of the present invention, there is provided a communication method for a receiver to communicate with a caller in accordance with ITU-T recommendation V.8 or G3 facsimile procedure depending upon a function of the caller, comprising the steps of: detecting establishment of a line; transmitting an ANSam signal to the caller; detecting a CM signal from the caller; and transmitting a DIS signal to the caller if the CM signal from the caller is not detected within a predetermined time period after the start of transmission of the ANSam signal.

According to yet another aspect of the present invention, there is provided a communication terminal apparatus for communicating with another communication terminal apparatus (i.e., a caller) in accordance with ITU-T recommendation V.8 or G3 facsimile procedure, comprising: a signal transmission means that transmits an ANSam signal to the another communication terminal apparatus after a line has been established between itself and the another communication terminal apparatus and a control means that makes the signal transmission means transmit a DIS signal to the another communication terminal apparatus when a CM signal from the caller is not detected within a predetermined time period after the start of transmission of the ANSam signal.

If the caller is equipped with V.8 communication functions, a CM signal is sent to the receiver (i.e., the communication terminal apparatus of the invention) from the caller in response to the ANSam signal from the receiver after a line has been established. Therefore, V.8 communication operations can be executed without hindrance between the caller and receiver based on detection of the CM signal. Conversely, in the case where the caller is a facsimile which is not equipped with V.8 communication functions, no CM signal is transmitted to the receiver from the caller after the line has been established even if an ANSam signal is sent to the caller. In this case, when a CM signal is not detected within a predetermined time period after the start of transmission of the ANSam signal, the caller is judged to be a facsimile apparatus equipped without V.8 communication functions. Then, a DIS signal is transmitted to the caller. Accordingly, upon detection of this DIS signal, the caller can send a DCS signal to the caller. Upon reception of the DCS signal, the receiver starts facsimile communication operations. Therefore, communications proceed without hindrance between the two parties.

The signal transmission means may a modem. After a line has been established, the control means sets the modem to a first mode (i.e., dual direction mode) in which the receiver can detect signals from the caller while the modem is transmitting ANSam signals to the caller. If a CM signal is not detected, the control means sets the modem to a second mode (i.e., single direction mode) in which only one way signal transmission is admitted to enable normal G3 facsimile communication operations. When the modem is set in the dual direction mode, a CM signal from the caller can be reliably detected even in the state of ANSam signal transmission. Also, when a CM signal is not detected, the G3 facsimile communication operations can be properly executed due to the setting of the modem in the single direction mode.

BRIEF DESCRIPTION OF THE ACCOMPANYING DRAWINGS

DETAILED DESCRIPTION OF THE PREFERRED EMBODIMENTS

Below, an embodiment of the present invention (i.e., a facsimile apparatus) will be described based on the accompanying diagrams.

Figure 1:
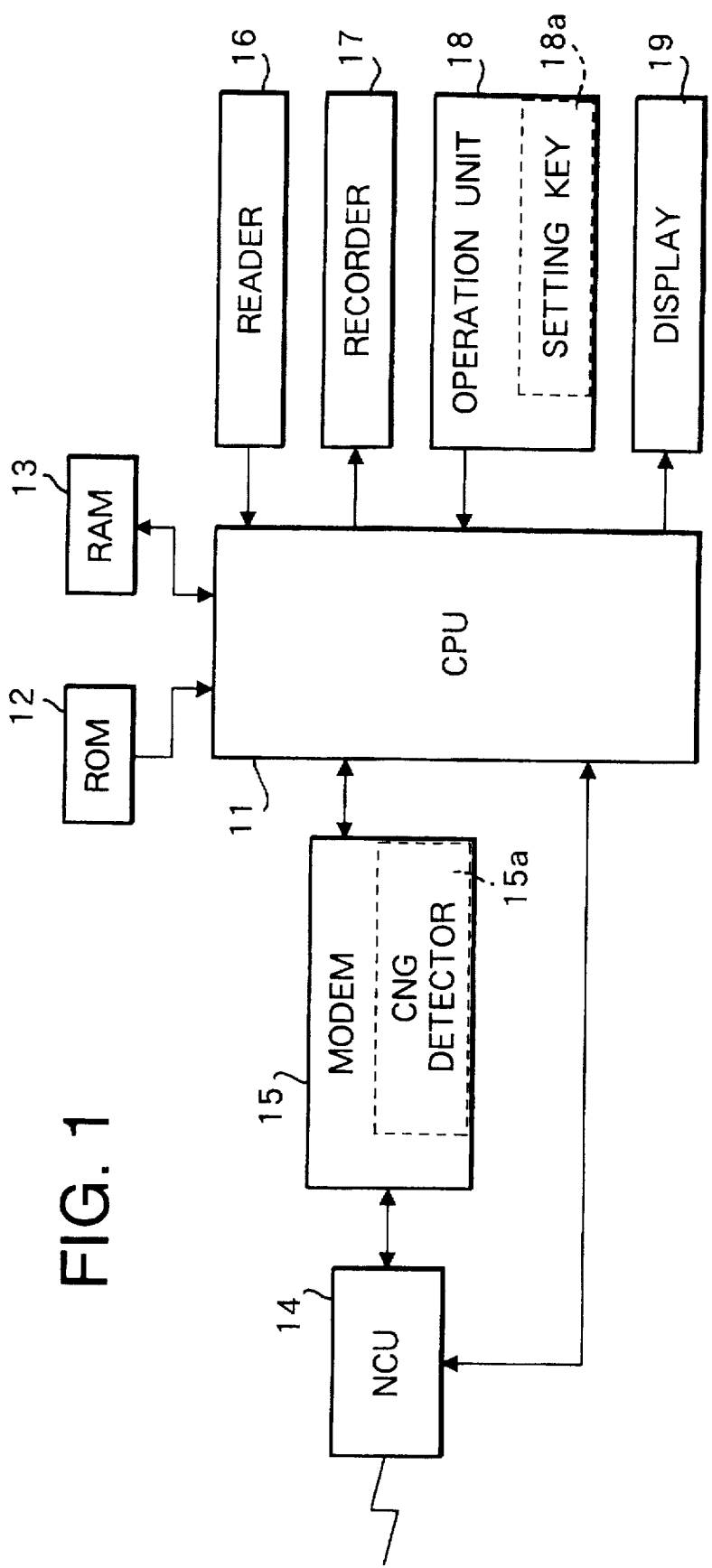
FIG. 1 is a block circuit diagram of a facsimile apparatus according to one embodiment of the present invention.

Referring to FIG. 1, ROM (read only memory) 12 which memorizes a program for controlling an operation of the entire facsimile apparatus etc. and RAM (random access memory) 13 which temporarily memorizes various information are connected with CPU (central processing unit) 11. In the present embodiment, the control means comprises the CPU 11, ROM 12 and RAM 13.

NCU (network control unit) 14 controls connection with a telephone line (not shown) and is equipped with, for example, functions that transmit a dial pulse which corresponds to a third party's facsimile number and detect a ringing signal or call signal, etc. A modem 15 (i.e., signal transmission means) modulates and demodulates transmission/reception data. The modem 15 is also equipped with a function for selectively enabling V.8 communication procedures and a function for enabling G3 communication procedures of a facsimile. It is further equipped with a CNG detection part 15a for detecting an incoming CNG signal from the caller. In other words, the modem 15 of the present embodiment can be set to either a single direction mode allowing half-duplex communication operations at the time of G3 facsimile communications or a dual direction mode allowing full-duplex communication operations at the time of V.8 communication.

A scanner 16 scans images on a document. A printer 17 prints images on a recording medium based on the received image data, which image data scanned by the scanner 16. An operation key unit 18 includes a dial key for entering a telephone number etc, a start key for beginning facsimile communication operations, a setting key 18a (will be described later) and other operation keys. A display 19 is provided for displaying various information.

Next, in accordance with the flowchart shown in FIG. 2, the communication operations that are carried out under the control of the CPU 11 will be described in the case where the facsimile apparatus of the present embodiment is the call receiver. The following description is also to be read with reference to the sequence diagrams of FIG. 3(A) and FIG. 3(B).

Figure 2:
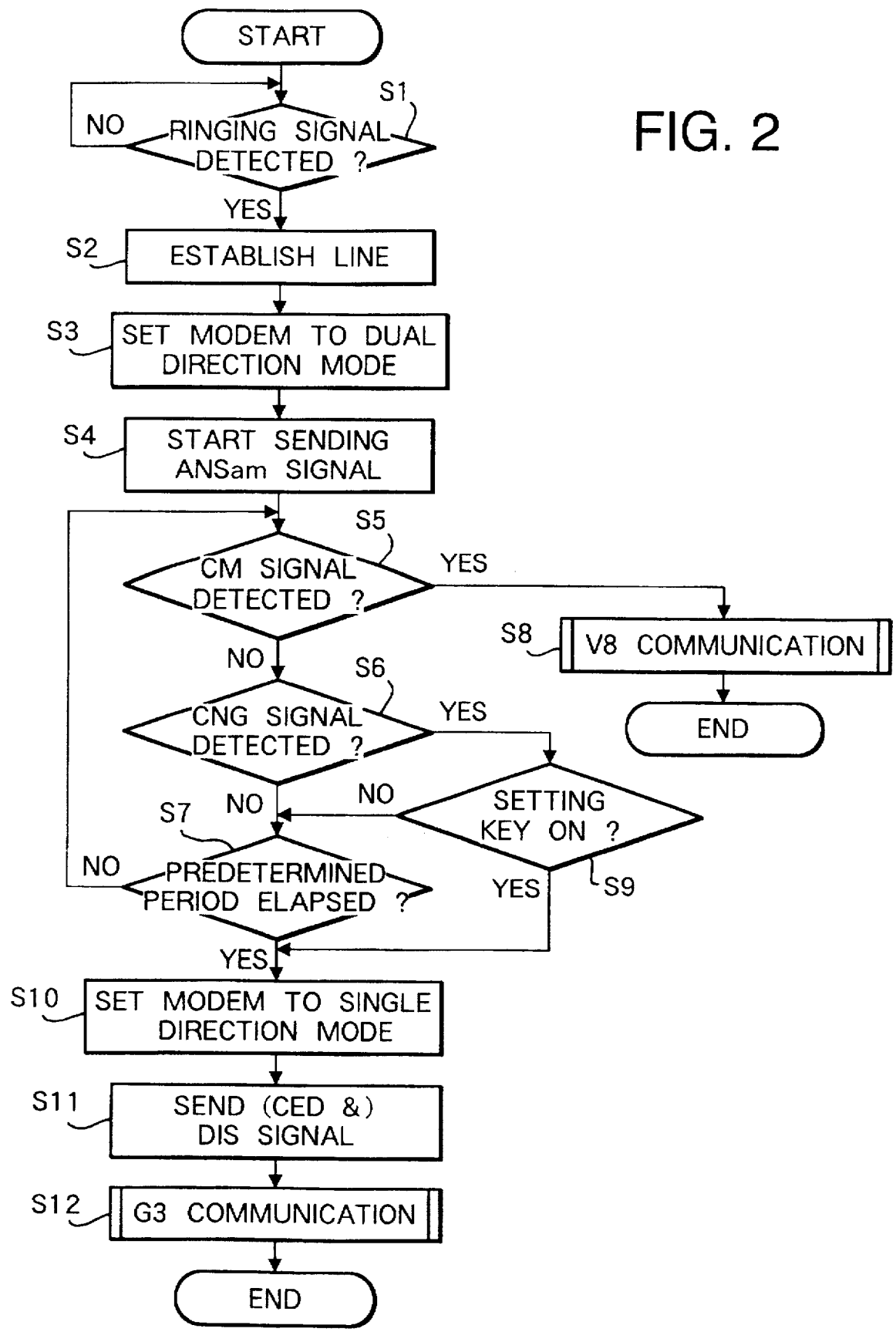
FIG. 2 is a flow chart showing transmission operations of the facsimile apparatus of FIG. 1.

As shown in FIG. 2, when the CPU 11 utilizes the NCU 14 to detect a ringing signal sent from an exchanger upon a call from the caller at step S1, the program moves to step S2 thereby controlling the NCU 14 to establish line connection to the caller. At step S3, the CPU 11 sets the modem 15 to the dual direction mode in which full-duplex communication operations are possible. At step S4, the CPU 11 causes the modem 15 to transmit an ANSam signal to the caller. This ANSam signal is a predetermined full-duplex response signal. Also, due to the modem 15 being set in the dual direction mode, the receiver (i.e., facsimile apparatus of the invention) can detect signals from the caller while it is transmitting the ANSam signal to the caller.

At step S5, the CPU 11 determines by the modem 15 whether a CM signal from the caller has been detected or not. This CM signal is the predetermined full-duplex control signal. At this point, if a CM signal is not detected, the program moves to step S6 and determines by the CNG detector 15a of the modem 15 whether a CNG signal from the caller has been detected or not. If a CNG signal is not detected, the program proceeds to step S7 and determines whether a predetermined time period has passed from the start of transmission of the ANSam signal. If the predetermined time period has not passed, the CPU 11 returns to step S5 and waits for the detection of the CM signal or CNG signal.

At step S5, if a CM signal is detected within the predetermined time, the CPU 11 determines that the caller is equipped with V.8 communication functions so that it moves to step S8 to execute V.8 communication operations and eventually concludes the processing. In other words, as shown in FIG. 3(A), the receiver transmits a JM signal in response to the CM signal from the caller, and carries out the predetermined communication operation in accordance with V.8 communication procedures after detection of the CJ signal from the caller and a 75±5ms no signal period.

Referring back to FIG. 2, if a CNG signal is detected within the predetermined time at step S6, the CPU 11 moves to step S9 and determines whether the setting key 18a of the operation key unit 18 is on or off. At this point, when the setting key 18a is off, the CPU 11 ignores the detection of the CNG signal and moves to step S7. If the setting key 18a is turned on, on the other hand, the CPU 11 determines that the caller is a normal G3 facsimile not equipped with V.8 communication functions which operates as shown in FIG. 3(B) and moves to the later described step S10.

Figure 3A:
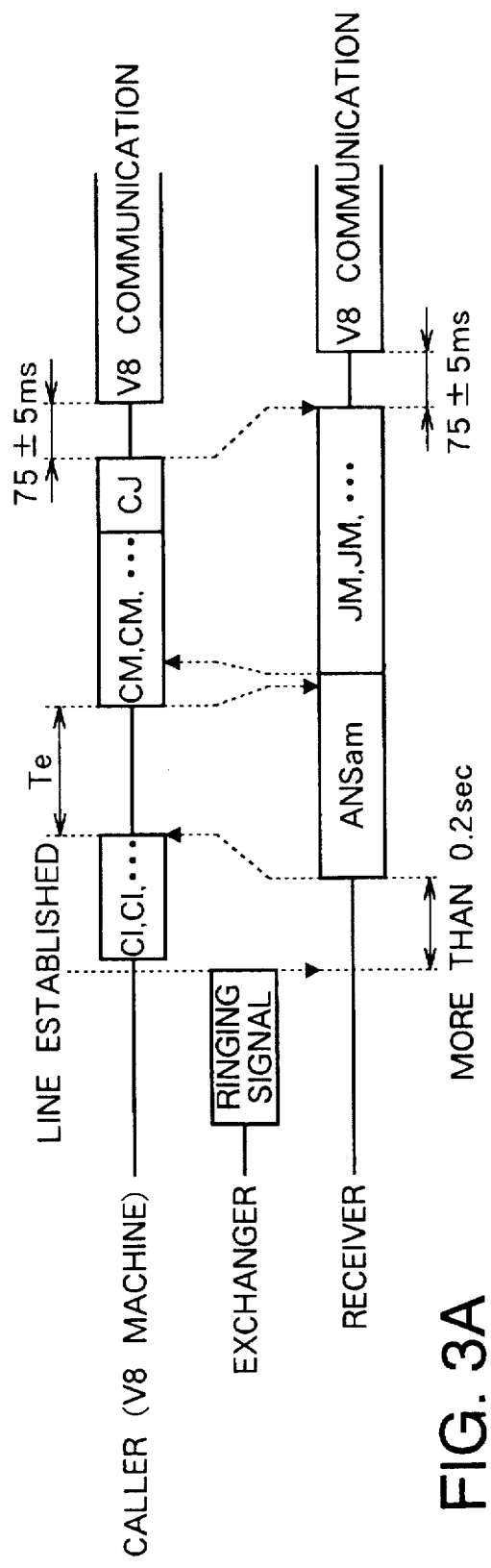
FIG. 3(A) is a sequence diagram showing the transmission operations when a caller is a V.8 facsimile machine.
Figure 3B:
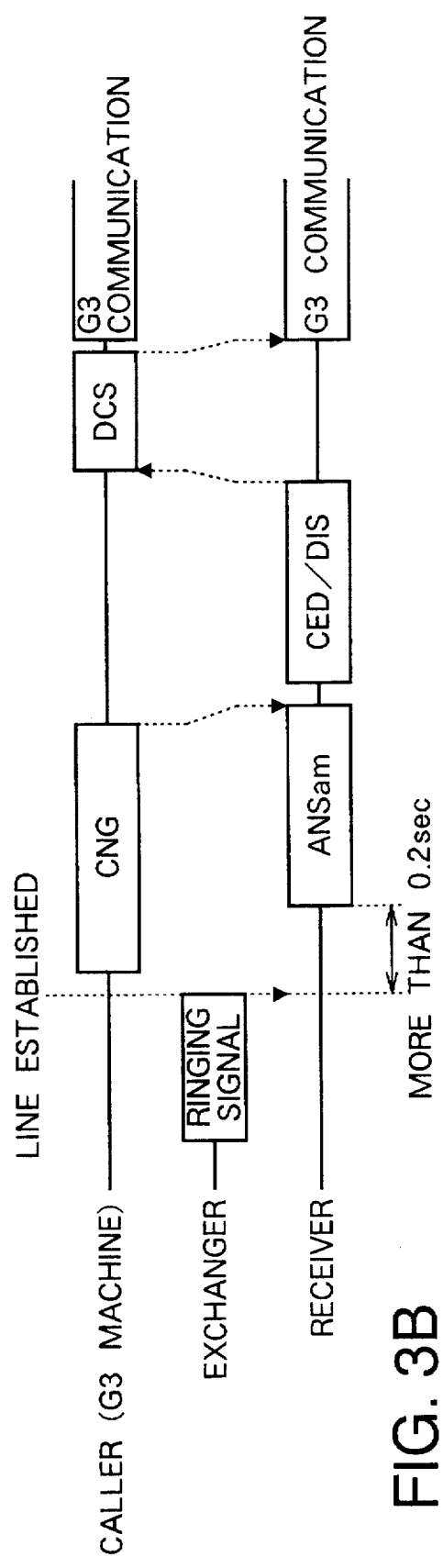
FIG. 3(B) is a sequence diagram showing the transmission operations when the caller is a G3 facsimile machine.

As shown in FIG. 3(A), when the caller is a V.8 machine equipped with V.8 communication functions, a CI signal (Call Indicator Signal) is generally transmitted as an option signal to the receiver in order for the caller to show it's own functions after a line is established. However, according to the recommendation V.8 of ITU-T, a CNG signal may be transmitted instead of CI signal. Because of this, even when the CNG signal from the caller is detected, the caller is not necessarily judged to be a G3 facsimile apparatus. Consequently, if manipulation of the setting key 18a selectively sets the facsimile apparatus on the receiving side to a mode in which the facsimile apparatus always believes that the caller is a G3 facsimile apparatus when a CNG signal is detected or to another mode in which the facsimile apparatus does not believe that the caller is a G3 facsimile apparatus upon detection of the CNG signal, a broader or elastic response is possible and an erroneous judgment of the apparatus can be easily handled.

If the predetermined time passes without detection of the CM signal or CNG signal (or if detection of the CNG signal is ignored) at step S7, the CPU 11 also judges the caller to be a normal G3 facsimile apparatus not equipped with V.8 communication functions and moves to step S10. In short, when the caller is a G3 facsimile apparatus, it is obvious that the CM signal is not transmitted to the receiver and that nor is the CNG signal transmitted if the caller manually transmits signals. Consequently, as these kinds of cases can be coped with, when the CNG signal is not detected within the predetermined time, the caller is also judged to be a facsimile apparatus which is not equipped with V.8 communication functions.

Furthermore, at step S10, the CPU 11 sets the modem 15 to the single direction mode in order to allow half-duplex communication operations. Specifically, in the facsimile communication, as signals are alternately transmitted and received between the caller and the receiver, the modem 15 is set to the single direction mode. Next, as understood from FIG. 3(B), the CPU 11 causes the modem 15 to transmit a DIS signal to the caller at step S11. In other words, this DIS signal is the predetermined response signal in accordance with the half-duplex communication method. It should be noted that before transmission of this DIS signal, the CED signal may be transmitted to the caller. After the CPU 11 detects a DCS signal from the caller by the modem 15, the facsimile communication operations in accordance with G3 communication procedures are executed at step S12 and the processing finishes.

As above on the present embodiment, in the case where the caller is equipped with V.8 communication functions, a CM signal is transmitted from the caller in response to the transmission of an ANSam signal after a line is established. Therefore, V.8 communication procedures can be executed unhindered between the parties based on the detection of the CM signal.

Conversely, in the case where the facsimile of the caller is not equipped with V.8 communication functions, a CM signal is not transmitted from the caller even upon transmission of an ANSam signal after a line is established. However, even in such a case, on the present embodiment, when a CM signal is not detected within a predetermined time period from the start of transmission of the ANSam signal, the caller is judged to be a facsimile apparatus equipped without V.8 communication functions and a DIS signal is transmitted to the caller. The caller transmits a DCS signal based on the detection of this DIS signal. Upon reception of the DCS signal at the receiver, facsimile communication operations can be executed without hindrance between the two parties.

Accordingly, on a facsimile apparatus of the present embodiment, even if the caller is an apparatus equipped with V.8 communication functions or an apparatus equipped only with G3 communication functions, communication operations can be executed between the two parties without communication problems. In other words, even if the caller is an apparatus equipped with full-duplex communication functions or an apparatus only equipped with half-duplex communication functions, there is no hindrance to communication between the caller and receiver.

Also, on the present embodiment, when a CNG signal from the caller is detected after the start of transmission of the ANSam signal, the caller is also judged to be a G3 facsimile apparatus and a DIS signal is transmitted to the caller. Accordingly, facsimile communication operations can be executed without hindrance between the two parties: even when the caller is a facsimile apparatus not equipped with V.8 communication functions, there is no danger of obstruction to the communication operations between the two parties.

Also, making or not making the judgment of whether the caller is a G3 facsimile apparatus or not when a CNG signal is detected can be arbitrarily determined by the setting key 18a. Therefore, the setting of the apparatus can be easily changed corresponding to whether the caller, which is a V.8 machine, transmits a CNG signal or not. Accordingly, a wide range of response is possible and an erroneous judgment of the apparatus can be easily handled.

In addition, on this embodiment, the modem 15 is firstly set to the dual direction mode after a line has been established. After that, it is set to the single direction mode when the caller is judged to be a G3 facsimile apparatus. Because of this, even in the state where an ANSam signal is being transmitted after establishing a line, the modem 15 can reliably detect a CM signal and the like from the caller. When the caller is judged to be a G3 facsimile apparatus later, the facsimile communication operations can be properly executed due to the setting of the modem 15 to the single direction mode.

It should be noted that the present invention is not limited to the above embodiment, but various changes and modifications may be made without departing from the spirit and scope of the invention. For example:

(1) After a line has been established, the operation may switch to V.8 communication immediately upon detection of a CI signal from the caller.

(2) DIS signal may be transmitted only when a CM signal is not detected within a predetermined time period from transmission start of the ANSam signal without carrying out detection of the CNG signal.

(3) The present invention may be applied to personal computer communication and other type of data communication.

What is claimed is:

1. A communication method for a receiver to communicate with a caller in a full-duplex manner or a half-duplex manner depending upon a function of the caller, comprising the steps of:

(A) detecting line establishment between the caller and the receiver, (B) transmitting a predetermined full-duplex response signal, (C) detecting a predetermined full-duplex control signal from the caller during the step of transmitting a predetermined full-duplex response signal, and (D) transmitting a predetermined half-duplex response signal to the caller when the predetermined control signal is not detected within a predetermined time period after initiation of transmission of the predetermined response signal.

2. A communication terminal apparatus for communicating with a second communication terminal apparatus in a full-duplex manner or a half-duplex manner depending upon a function of the second communication terminal apparatus, comprising:

signal transmission means for transmitting to the second communication terminal apparatus a predetermined full-duplex response signal after a line has been established between the two communication terminal apparatuses, means for detecting a predetermined full-duplex control signal from the second communication terminal apparatus, and control means for making the signal transmission means transmit to the second communication terminal apparatus a predetermined half-duplex response signal when the predetermined control signal from the second communication terminal apparatus is not detected within a predetermined time period after the start of transmission of the response signal.

3. The communication terminal apparatus of claim 2, wherein the signal transmission means comprises a modem, and the control means sets after establishment of the line the modem to a dual direction mode in which detection of signals from the caller is possible while the modem is transmitting the response signal and sets the modem to a single direction mode in which a half-duplex communication response is possible when the control signal from the caller is not detected.

4. A communication method for a receiver to communicate with a caller in accordance with ITU-T recommendation V.8 or G3 mode depending upon a function of the caller, comprising the steps of:

(A) detecting establishment of a line connection between the caller and the receiver, (B) transmitting a modified answer tone (ANSam) to the caller, (C) detecting a call menu signal (CM) from the caller during the step of transmitting a modified answer tone (ANSam) to the caller, (D) transmitting a digital identification signal (DIS) to the caller after the step of transmitting a modified answer tone (ANSam) to the caller when the call menu signal (CM) is not detected within a predetermined time period after the start of transmission of the modified answer tone (ANSam), and (E) transmitting a joint menu signal (JM) to the caller after the step of transmitting a modified answer tone (ANSam) to the caller when the call menu signal (CM) is detected during the step of transmitting a modified answer tone (ANSam) to the caller.

5. The method of claim 4, comprising the step of promptly starting a recommendation V.8 communication operation when a call indicator signal (CI) is detected after the step of detecting establishment of line connection between the caller and the receiver.

6. The method of claim 4, comprising the steps of:

determining whether a call tone (CNG) from the caller is received by the receiver within a predetermined time period after the start of transmission of the modified answer tone (ANSam), immediately transmitting a digital identification signal (DIS) to the caller when the receiver is set to a first mode in which detection of the calling tone is effective, and continuing detection of the call menu signal (CM) when the caller is set to a second mode in which detection of the calling tone is ineffective.

7. A communication terminal apparatus for communicating with a second communication terminal apparatus in accordance with ITU-T recommendation V.8 or G3 mode depending upon a function of the caller, comprising:

signal transmission means for transmitting a modified answer tone (ANSam) to the second terminal apparatus after a line has been established between the two terminal apparatuses, means for detecting a call menu signal (CM) from the second terminal apparatus when a modified answer tone (ANSam) is transmitted to the second terminal apparatus, control means for causing the signal transmission means to transmit a digital identification signal (DIS) to the second terminal apparatus after a modified answer tone (ANSam) is transmitted to the second terminal apparatus when the call menu signal (CM) is not detected within a predetermined time period after the start of transmission of the modified answer tone (ANSam), and means for transmitting a joint menu signal (JM) to the second terminal apparatus after a modified answer tone (ANSam) is transmitted to the caller when a call menu signal (CM) is detected during transmission of a modified answer tone (ANSam) to the caller.

* * * * *